UNITED STATES PATENT OFFICE.

HERMAN A. BRANDENBURGER, OF ST. LOUIS, MISSOURI.

COMPOSITION FOR COATING TIRE-ARMOR.

1,122,248.  Specification of Letters Patent.  Patented Dec. 29, 1914.

No Drawing.   Application filed October 15, 1913.   Serial No. 795,258.

*To all whom it may concern:*

Be it known that I, HERMAN A. BRANDENBURGER, a citizen of the United States, residing at the city of St. Louis, State of Missouri, have invented certain new and useful Improvements in Compositions for Coating Tire-Armor, of which the following is a specification.

This invention consists of a new and improved composition especially adapted for use in the manufacture of tires for motor vehicles and the like, particularly of the type of tire which constitutes the subject-matter of my simultaneously-filed application for patent, though, of course, the said composition may be used for making packing, and for other purposes.

One of the ingredients of this composition is rubber cement, which consists of caoutchouc triturated with a small quantity of sulfur and dissolved in benzene, the cement being employed because of the superior waterproof and flexible qualities of its caoutchouc base.

In forming the said composition a quantity of rubber cement is liquefied or nearly liquefied by thoroughly mixing a hydrocarbon, preferably benzene, with same, and then a lubricant, preferably graphite, is thoroughly mixed therewith, with the result of making a viscous mass. The mixing of the rubber cement, hydrocarbon, and graphite may be accomplished by stirring or agitating same manually, or, if desired, by mechanical stirrers, mixers, or agitators.

This viscous composition made as just described may be molded in the desired shape, or it may be applied to a surface by a brush or by dipping, so as to form either a filler or a coating, or both a filler and a coating therefor, when same sets or dries.

In practice, it has been found that by using substantially equal parts of rubber cement and graphite and sufficient hydrocarbon to make the composition viscous, the latter can be applied to a surface by means of a brush, and is particularly well adapted for use in the manufacture of motor vehicle tires, such, for example, as the tire disclosed in my other application for patent hereinabove mentioned, and, also, for similar use in the manufacture of the tires described in my United States Letters-Patent No. 1,031,416, granted July 2, 1912, and No. 1,034,966, granted August 6, 1912. When the composition is used in the manufacture of the above-mentioned tires, it is preferably applied, while in a viscous state, to the inner surface of the chain fabric by means of a brush or otherwise, whereby it fills all the cracks, crevices, and interstices in the chain fabric and, also, forms a coating for same, which coating may be of any desired thickness. When this coating sets or dries, it forms the inner wall of the tire and protects the inner tube from the chain fabric, the chain fabric and the coating thus constituting the casing or shoe of the tire.

The presence of the caoutchouc in the composition not only renders the latter waterproof, but, also, makes same flexible, so that it will bend with the fabric without danger of separating therefrom or of cracking or breaking, while the graphite acts as an efficient lubricating agent which prevents abrasion of the surface of the coating and the inner tube or the chain fabric or anything else in engagement therewith. It also lubricates the joints of the metal fabric.

While this composition is particularly well adapted for use in the manufacture of motor vehicle tires and the like, as hereinabove described, yet it should be understood that it may be used as packing and for other suitable purposes.

It will be evident that the proportioning of the ingredients will, in actual practice, be determined by the use to which the composition is to be put, and that the ratio of the rubber cement and graphite may be varied to increase either the flexibility or the lubricity of the composition.

I claim:

A lubricating and protecting composition for coating metal fabric consisting of a mixture of liquefied rubber cement and graphite.

In testimony whereof I hereunto affix my signature in the presence of two witnesses.

HERMAN A. BRANDENBURGER.

Witnesses:
 GEORGE G. ANDERSON,
 WALTER C. GUELS.